United States Patent
Coldrey et al.

(10) Patent No.: US 11,050,466 B2
(45) Date of Patent: Jun. 29, 2021

(54) ANTENNA ALIGNMENT IN A NON-LINE OF SIGHT CONDITION

(71) Applicant: Telefonaktiebolaget LM Ericsson (publ), Stockholm (SE)

(72) Inventors: Mikael Coldrey, Borås (SE); Mona Hashemi, Ottawa (CA); Lars Manholm, Gothenburg (SE); Jonas Fridén, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/765,954

(22) PCT Filed: Dec. 15, 2017

(86) PCT No.: PCT/EP2017/083036
§ 371 (c)(1),
(2) Date: May 21, 2020

(87) PCT Pub. No.: WO2019/114985
PCT Pub. Date: Jun. 20, 2019

(65) Prior Publication Data
US 2020/0358482 A1 Nov. 12, 2020

(51) Int. Cl.
*H04B 7/0426* (2017.01)
*H04B 7/0408* (2017.01)
*H04B 7/06* (2006.01)

(52) U.S. Cl.
CPC ........... *H04B 7/043* (2013.01); *H04B 7/0408* (2013.01); *H04B 7/061* (2013.01); *H04B 7/0617* (2013.01); *H04B 7/0695* (2013.01)

(58) Field of Classification Search
CPC ...... H04B 7/043; H04B 7/0408; H04B 7/061; H04B 7/0617; H04B 7/0695; H01Q 3/24;
(Continued)

(56) References Cited

U.S. PATENT DOCUMENTS

| 4,696,053 A | * | 9/1987 | Mastriani | H04B 7/005 342/359 |
| 2002/0057225 A1 | * | 5/2002 | Spirtus | H01Q 3/005 343/766 |

(Continued)

FOREIGN PATENT DOCUMENTS

| WO | 2014117855 A1 | 8/2014 |
| WO | 2014161610 A1 | 10/2014 |
| WO | 2017063695 A1 | 4/2017 |

OTHER PUBLICATIONS

Hashemi, M. et al., "Simulation Performance of NLOS Wireless Backhaul Using Automatically Aligned Antennas with Limited Scan Range", 2016 10th European Conference on Antennas and Propagation (EuCAP), Apr. 10, 2016, pp. 1-5, IEEE.
(Continued)

*Primary Examiner* — Sophia Vlahos
(74) *Attorney, Agent, or Firm* — Coats & Bennett, PLLC

(57) ABSTRACT

A method for alignment of an antenna in a microwave radio link system in Non-Line-Of Sight (NLOS) conditions. The method includes having a pointer indicating a first position on a surface to define a first candidate reflection/diffraction point on the surface, aligning a first antenna at a first node and a second antenna at a second node towards the first candidate reflection/diffraction point, and recording a relevant property concerning the channel quality between the first node and the second node via the first candidate reflection/diffraction point. The pointer may be a drone. Related devices and systems are disclosed.

8 Claims, 3 Drawing Sheets

(58) Field of Classification Search
CPC .......... H01Q 3/02; H01Q 19/104; H01Q 3/08; H01Q 3/04; H01Q 1/1257; G01S 3/38
See application file for complete search history.

(56) References Cited

U.S. PATENT DOCUMENTS

| | | | |
|---|---|---|---|
| 2012/0206299 A1* | 8/2012 | Valdes-Garcia | H01Q 19/102 342/359 |
| 2015/0341095 A1 | 11/2015 | Yu et al. | |
| 2015/0364818 A1 | 12/2015 | Derneryd et al. | |
| 2016/0323047 A1 | 11/2016 | Olsson et al. | |
| 2017/0155456 A1 | 6/2017 | Wennerlöf et al. | |
| 2018/0234192 A1* | 8/2018 | Mester | H04M 1/72403 |
| 2018/0259612 A1* | 9/2018 | Olsson | H01Q 1/125 |
| 2018/0352444 A1* | 12/2018 | Sridharan | H03F 3/602 |

OTHER PUBLICATIONS

Yuan, W. et al., "An Efficient Beam Training Technique for mmWave Communication Under NLoS Channel Conditions", IEEE Wireless Conference and Networking Conference (WCNC 2016) Track 1: PHY and Fundamentals, Apr. 3, 2016, pp. 1-6, IEEE.

* cited by examiner

ANTENNA ALIGNMENT IN A NON-LINE OF SIGHT CONDITION

TECHNICAL FIELD

The disclosure relates to a method and system for alignment of an antenna in a microwave radio link system in Non-Line-Of Sight (NLOS) conditions.

BACKGROUND

Conventionally microwave radio links are deployed in Line-Of-Sight (LOS) conditions but due to their high system gain they can also be deployed in Non-Line-Of-Sight (NLOS) conditions. However, proper antenna alignment is crucial for successful NLOS deployment. The antennas of a NLOS radio link are typically aligned towards a common reflection or diffraction point. The alignment of antennas in NLOS conditions is for example disclosed in "Simulation performance of NLOS wireless backhaul using automatically aligned antennas with limited scan range", 10th European Conference on Antennas and Propagation (EuCAP) 2016, Apr. 10-15 2016 (M. Hashemi, L. Manholm, et al.)

However, common reflection and diffraction points that provide good enough link gain may be hard to find. There are a few techniques for antenna alignment in NLOS conditions. One is to use a wide beam antenna in one end and a narrow beam antenna in the other end and such methods are discussed in WO2014117855 or WO2014161610. The wide beam antenna is used to illuminate different surfaces that have on beforehand been identified such that the narrow beam antenna can be aligned towards these surfaces. Once a good direction has been identified by the antenna in the second end, the wide beam antenna in the first end is replaced by a narrow beam antenna and alignment of this antenna takes place. Other techniques may involve the use of cameras for aiding the alignment procedure.

A common drawback for the techniques discussed above is that they are time consuming e.g. due to a two step procedure using first a wide beam antenna and thereafter a narrow bean antenna. For successful deployment it is key to make the alignment process quick and simple towards a good reflection/diffraction point. Hence, there is a desire for an improved method which may solve the problem of too long time for aligning antennas in NLOS conditions in the methods known today.

SUMMARY

The present disclosure comprises a method and a system to be used in order to improve the alignment of antennas and select a preferred reflection/diffraction point in a more efficient way. In particular, the present disclosure discloses a method and a system which allows narrow beams antennas to be used at both nodes without a need or desire for using broad beam antennas in a previous step.

The method comprises the steps of:
Having a pointer indicating a first position on a surface to define a first candidate reflection/diffraction point on the surface
Aligning a first antenna at a first node and a second antenna at a second node towards the first candidate reflection/diffraction point
Record a relevant property concerning the channel quality between the first node and the second node via the first candidate reflection/diffraction point.

By using a pointer indicating a position on a surface, the candidate reflection point may be easily recognized and aimed at by the first antenna at the first node and by the second antenna at the second node.

To be noted, a surface may be the surface of a rather large planar area such as a wall but may also be surfaces of objects such as roof edge, building corner or a collection of scatterers in a street corner, e.g. lamp posts or signs.

In general, the alignment of the antennas is performed by automatic adjustment as well as the measurements and recordings of the relevant property or properties concerning the channel quality. However, the alignment and/or the measurements and/or recordings could also be made manually. Hence, the process may be essentially fully automatized, semiautomatic or essentially manual. As an example of a semiautomatic process, an operator could manually align the antennas towards the candidate reflection/diffraction point while the measuring and recording of the relevant property concerning the channel quality. Still another option for a semiautomatic process is to select the candidate reflection/diffraction point manually and once this point has been selected there may be an automatic process for aligning the antennas towards the candidate reflection/diffraction point and likewise automatically perform the measuring and recording of the relevant property concerning the channel quality.

According to one aspect of the disclosure, the method may further comprise the steps of:
Repeating the steps in claim 1 for a number N of different candidate reflection/diffraction points
Compare the relevant property concerning the channel quality between the first node and the second node via the N different candidate reflection/diffraction points.
Select a preferred reflection/diffraction point from the N different candidate reflection/diffraction points based on the recorded relevant property concerning the channel quality between the first node and the second node via the candidate reflection/diffraction points
Aligning the first antenna and the second antenna towards the preferred reflection/diffraction point so as to link the antennas in the microwave radio link system.

By using a pointer indicating a number of different positions, a desired number of candidate reflection points may be easily recognized and aimed at by the first antenna at the first node and by the second antenna at the second node such that a number of different candidate reflection points may be measured and evaluated quickly and swiftly in order to select a preferred reflection point.

According to still another aspect of the disclosure, the method may further comprise the steps of:
Select the candidate reflection/diffraction point (3:n, n=1 to p) as a preferred reflection/diffraction point (3:p) if the recorded relevant property concerning the channel quality between the first node (A) and the second node (B) via the candidate reflection/diffraction point (3:n) is within a predefined range or above or below a prescribed threshold value
Aligning the first antenna (4a) and the second antenna (4b) towards the preferred reflection/diffraction point (3:p) so as to link the antennas (4a, 4b) in the microwave radio link system.

By using a predefined range or threshold value of a recorded property concerning the channel quality, the time for performing the selection process to find a preferred reflection point may be decreased since the selection process will come to an end when a reflection/diffraction point being good enough has been found and there is no need to evaluate a predefined number of candidate reflection/diffraction points.

According to one embodiment of the disclosure, the method comprises a drone which is used as a pointer for the candidate reflection/diffraction point.

The use of drone has the benefit of being able to be able to locate a physical target at remote locations which may be hard to reach otherwise.

According to one embodiment of the invention the drone is a passive device with a microwave corner reflector for using a microwave signal from the antennas for alignment of the antennas.

By using a reflector for a microwave signal, the alignment of the antenna may be performed by using the radio link communication system signal and no further signal is needed for alignment.

According to one embodiment of the invention the drone is a passive device with an ultrasound corner reflector for using an ultrasound signal from the antennas for alignment of the antennas.

By using a reflector for a ultrasound signal, which is a separate signal apart from the signals used in the radio link communication system, the alignment of the antenna may be performed without interfering with the radio link communication system signal.

According to one embodiment of the disclosure the drone has a light source such that alignment of the antennas can be done by the use of cameras or other aiming means located in the vicinity of the antennas.

Other aiming means could for example be a sight, rifle scope or any means able of recognizing the lighted spot when aimed at.

By using a light the drone may be detected and aimed at also when in dark conditions.

According to one embodiment of the disclosure the drone is designed with a distinctive mark, e.g. a color, pattern or shape, such that alignment of the antennas can be done by the use of cameras or other aiming means located in the vicinity of the antennas recognizing the drone.

By using a distinctive mark the drone may not be easily mistaken for another drone or object and may be easily distinguished in broad daylight.

According to one embodiment of the disclosure the candidate reflection/diffraction point is selected by the use of a light or laser pointer pointing out the candidate reflection/diffraction point on the surface.

By using a laser pointer or light the candidate reflection/diffraction point may be pointed from a distance without the need for a physical object to be close to the candidate reflection/diffraction point.

According to one embodiment of the disclosure the light source or laser pointer is attached to the first antenna and/or the second antenna.

By attaching the light source or laser pointer to the antennas it may be ensured that the antenna and the light will be pointing in the same direction towards the candidate reflection/diffraction point. In addition, if both antennas are provided with a light source or laser pointer it may easily be detected visually that both lights from both the antennas are directed towards the same point.

The disclosure also relates to a system for alignment of an antenna in a microwave radio link system in Non-Line-Of Sight (NLOS) conditions, said system comprising:
 a first antenna at a first node
 a second antenna at a second node
 a pointer for indicating a position on a surface to define a candidate reflection/diffraction point on the surface
 a record unit for reading a relevant property concerning the channel quality between the first node and second node via the candidate reflection/diffraction point.

By using such a system a candidate reflection point may be easily recognized and aimed at by the first antenna at the first node and by the second antenna at the second node in order to measure and evaluate a relevant property concerning the channel quality.

According to one embodiment of the system the pointer is a drone.

The use of drone has the benefit of providing a system which is able to locate a physical target at remote locations which may be hard to reach otherwise.

According to one embodiment of the system the pointer is a light source or a laser.

By using a laser pointer or light instead of a drone the candidate reflection/diffraction point may be pointed from a distance without the need for a physical object to be close to the candidate reflection/diffraction point.

According to one embodiment of the system said light or laser is located on the first antenna and/or the second antenna.

By attaching the light source or laser pointer to the antennas it may be ensured that the antenna and the light will be pointing in the same direction towards the candidate reflection/diffraction point. In addition, if both antennas are provided with a light source or laser pointer it may easily be detected visually that both lights from both the antennas are directed towards the same point.

BRIEF DESCRIPTION OF THE DRAWINGS

The present invention will now be described more in detail with reference to the appended drawings, where.

DETAILED DESCRIPTION

Figure 1:
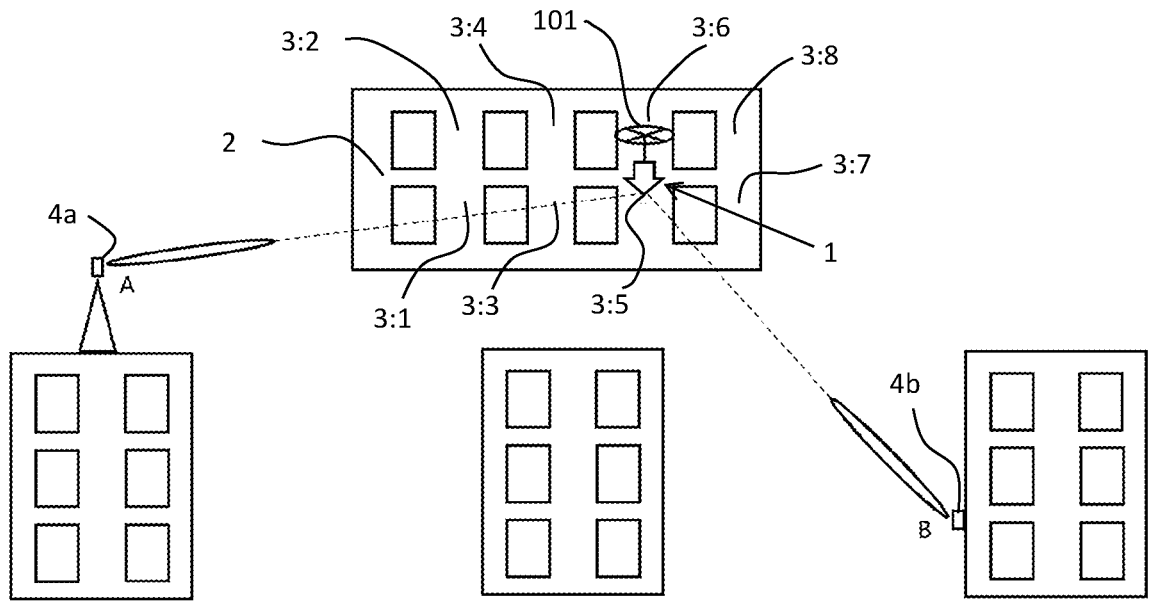
FIG. 1 shows a system for alignment of an antenna in a microwave radio link system in Non-Line-Of Sight (NLOS) conditions using a drone.

In FIGS. 1 and 2 are disclosed different aspects of the disclosure concerning systems for antenna alignments. The objective is to align antennas 4a, 4b of a microwave radio link that are deployed in Non-Line-Of Sight (NLOS) conditions from each other, i.e. there is no Line-Of-Sight (LOS) path between the antennas 4a, 4b. Thus the antennas 4a, 4b need to be aligned towards a common reflection/diffraction point 3:n to establish a communication link. It can be very difficult for the antennas to align towards a common reflection/diffraction point 3:n since they don't know where it is located. The antennas 4a, 4b typically use narrow high-gain beams which makes the alignment even more difficult since the antennas need to align carefully towards a common reflection/diffraction point 3:n. Often one can have a rough idea of where a good reflection or diffraction point can be located, e.g. at a certain building wall, roof top, building corner or a collection of scatterers in a street corner, e.g. lamp posts or signs. Such information is good to have but it is not enough for fine alignment of narrow beam antennas. This is where the pointer 1 comes into use.

In FIG. 1 is shown a system for alignment of an antenna in a microwave radio link system in (NLOS) conditions according to one aspect of the disclosure. The system comprises a pointer 1 which is used for indicating a position on a surface 2. In this case the pointer 1 is exemplified as a drone 101. The drone 101 may move in the vicinity of the surface 2 in order to indicate a position so as to define a first candidate reflection/diffraction point 3:1 on the surface 2. When a first candidate reflection/diffraction point 3:1 has been selected, a first antenna 4a located at a first node A and a second antenna 4b located at a second node B will be aligned towards the first candidate reflection/diffraction point 3:1. The antennas 4a, 4b of the two nodes A, B are in NLOS to each other, but in order to select a suitable candidate reflection/diffraction point both the first antenna 4a and the second antenna 4b should be in Line Of Sight (LOS) to the drone 101, which makes the alignment towards the drone 101 straightforward. When the first and second antennas 4a, 4b are aligned towards the first candidate reflection/diffraction point 3:1, the system records the channel quality of the NLOS path between the two nodes A, B via the candidate reflection/diffraction point 3:1 at the node position.

In general, the drone 101 will continue to search for further candidate reflection/diffraction points 3:n until a number N, in this case eight, candidate reflection/diffraction points 3:n has been selected. The key is that the drone 101 is in LOS to both nodes A and B which makes the alignment towards the drone straightforward. For example, the drone may be painted with certain color to make it more visible which would even further simplify the alignment. For each of the candidate reflection/diffraction points 3:n (n=1 to N) the drone indicates, the antennas 4a, 4b are aligned towards candidate reflection/diffraction point 3:n and the system records the channel quality of the NLOS path between the two nodes A, B via the candidate reflection/diffraction point 3:n at the node position.

Once the channel quality for all candidate reflection/diffraction points 3:n, n=1 to N, have been recorded the system finally aligns its antennas to the preferred reflection/diffraction point 3:p, in general the candidate reflection/diffraction point 3:n having the best channel quality out of the recorded points. Once the final alignment has been done the system is ready to switch into regular mode of operation.

A simple and therefore may be preferred embodiment is that the drone 101 is a simple passive drone that flies from location to location while the microwave link antennas at nodes A and B align their narrow beam towards the drone 101 or a pre-defined position close to the drone 101 for the drone not to interfere with the reflection/diffraction point 3:n and record the channel quality for each candidate reflection/diffraction point 3:n the drone 101 indicates. The link antennas 4a, 4b at nodes A and B can simply record the position (angles) of the alignment and channel quality for each candidate reflection/diffraction point 3:n the drone 101 flies to.

In the above, it has been suggested that the drone 101 is more or less predestined to indicate a number N candidate reflection/diffraction points 3:1 to 3:N and thereafter select the preferred reflection/diffraction point 3:p. However, it is of course also possible that if a candidate reflection/diffraction point 3:n is found having a channel quality between the first node (A) and the second node (B) via the candidate reflection/diffraction point 3:n is within a predefined range or above a prescribed threshold value it could be selected as the preferred reflection/diffraction point 3:p without the need to evaluate all candidate reflection/diffraction point 3:1 to 3:N.

According to one aspect of the disclosure, the drone 101 is a passive device with a corner reflector for alignment using the microwave signal itself.

According to one aspect of the disclosure the drone 101 has an ultra sound corner reflector in order not to affect the electromagnetic connections.

According to one aspect of the disclosure, the drone 101 has a light source, so that alignment can be done with cameras located at transmitter A and B positions.

According to one aspect of the disclosure, the drone 101 has a distinct color or pattern, so it is easily identified and tracked using cameras or other aiming means at nodes A and B.

Figure 2A:
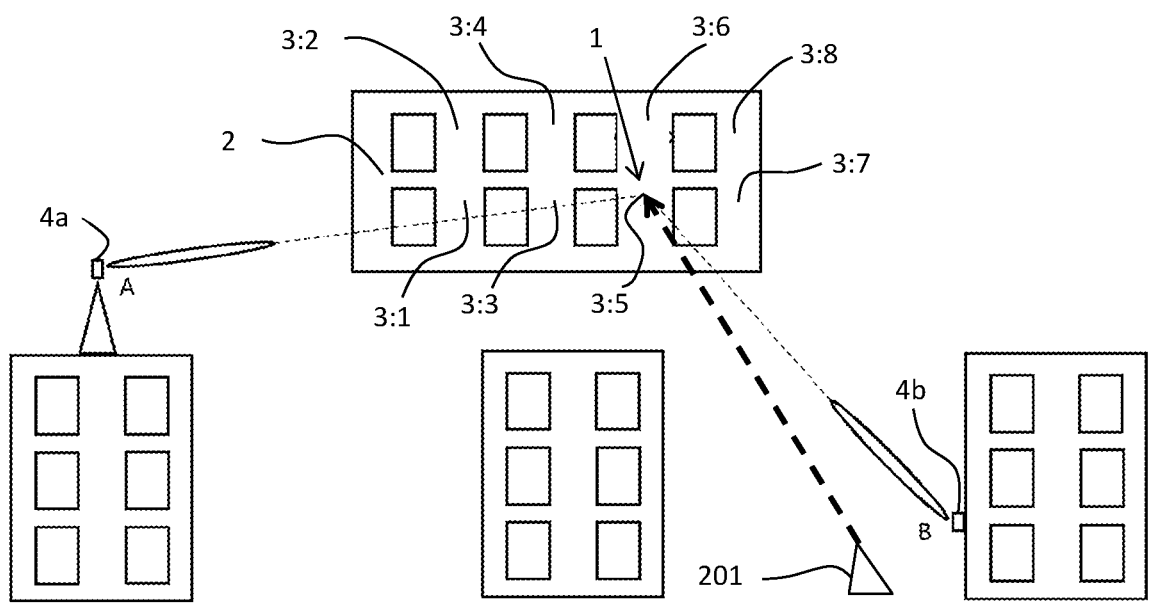
FIG. 2 shows different systems for alignment of an antenna in a microwave radio link system in Non-Line-Of Sight (NLOS) conditions using a laser device.
Figure 2B:
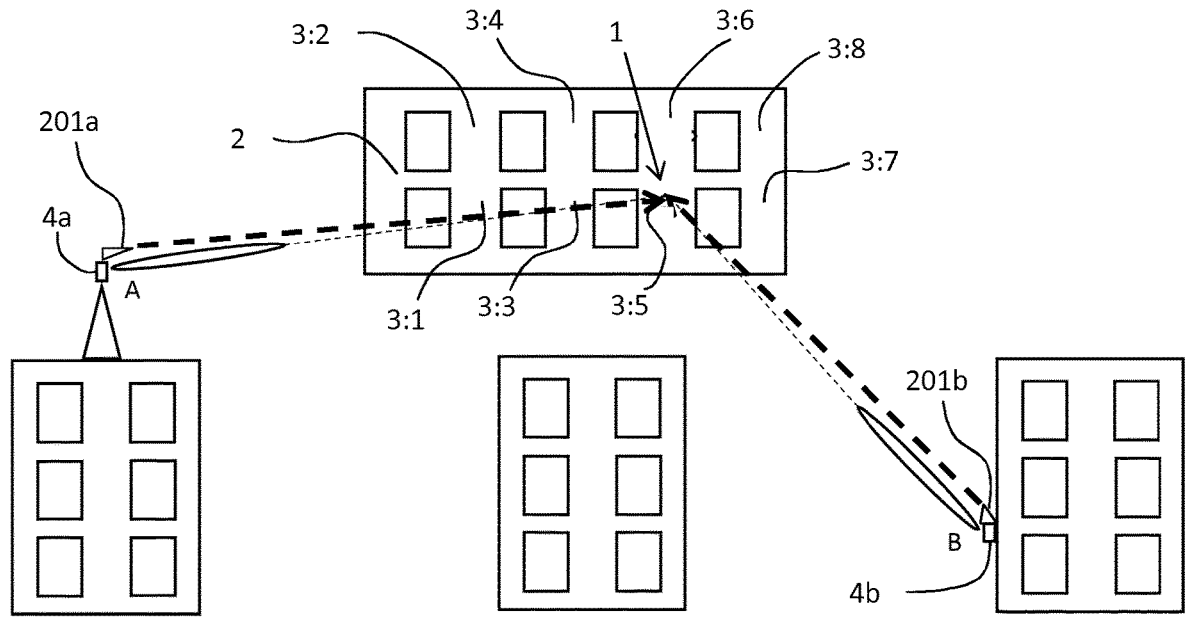

In FIGS. 2a and 2b the drone 101 (see FIG. 1) has been replaced with a laser 201, 201a, 201b to function as a pointer 1. In FIG. 2a a separate laser unit 201 is used which points at a candidate reflection/diffraction point 3:n, in this case point 3:5. The system is then controlled as already described in FIG. 1 to align the antennas 4a, 4b towards the selected candidate reflection/diffraction point 3:5 and the channel quality of the link between the first antenna 4a and second antenna 4b is used.

To use a laser device 201 may be advantageous in that it may be easier to control and select different places than for a drone. However, it may be hard to detect the pointer 1 from the laser 201 in broad day light and it will not be possible to have any equipment close to the candidate reflection/diffraction point 3:n as is possible when a drone is used, e.g. a reflector of any kind. However, the basic principle for alignment of the antennas 4a, 4b will be the same whether a drone 101 as in FIG. 1 or a laser device 201 as in FIG. 2a will be used.

In FIG. 2b another aspect of using a laser device is disclosed. In FIG. 2 a first laser device 201a has been located on the first antenna 4a and a second laser device 201b has been located on the second antenna 4b. In this case it may thus be possible to easily know that both antennas 4a, 4b actually are directed and aligned towards the same candidate reflection/diffraction point 3:n since the pointers 1 from each laser device 201a, 201b should be pointing at the very same spot. Hence, the respective laser devices 201a, 201b of the respective antennas 4a, 4b should then of course be directed to point in the same direction as the antenna radio link signal. Hence, this arrangement will give a visual feedback to an operator aligning the antennas that they are actually pointing at the same candidate reflection/diffraction point 3:n in a way which is not the case in the arrangements in FIGS. 1 and 2a.

The basic principle for alignment of the antennas 4a, 4b will be the same as in the previous figures. It shall be noted that it is of course possible to use only one laser device 201a or 201b instead of having a laser device on each one of the antennas 4a, 4b and the arrangement will in that case remind a lot of the arrangement in FIG. 2a.

Figure 3A:
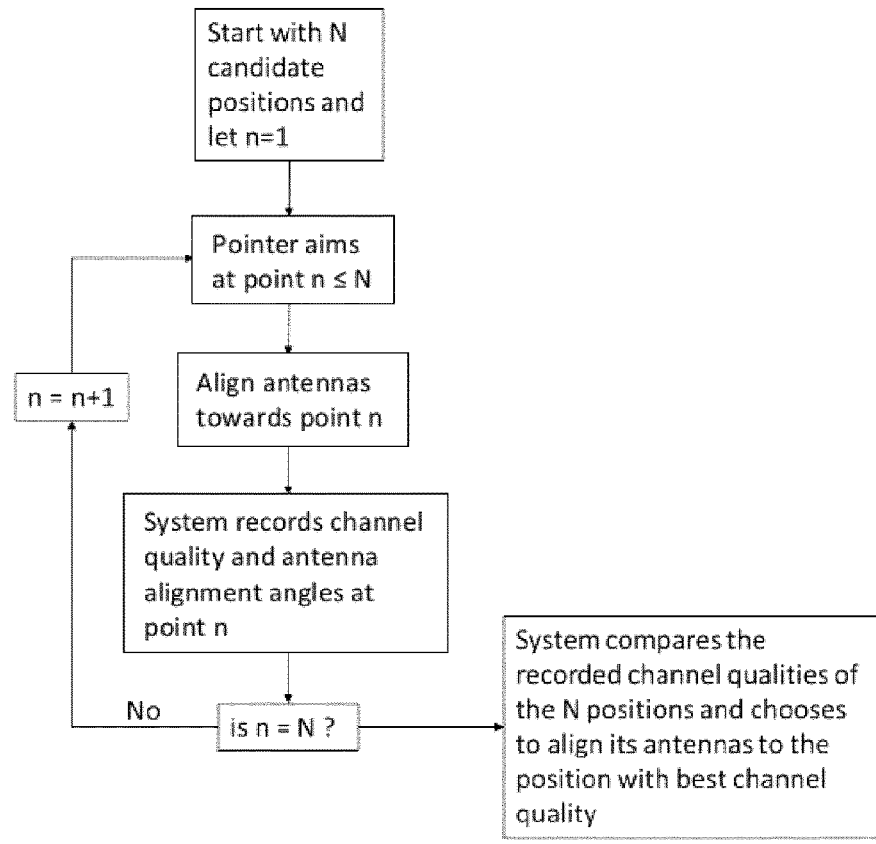
FIG. 3 shows flow charts for different methods for alignment of an antenna in a microwave radio link system in Non-Line-Of Sight (NLOS) conditions.

In FIG. 3a is a first aspect of a method for antenna alignment of radio links which are deployed in Non-Line-Of-Sight (NLOS) conditions. According to this aspect of the invention, N candidate reflection/diffraction points 3:n are predefined. The pointer 1 indicates and aims first at the candidate reflection/diffraction point 3:1. In the next step, the antennas 4a, 4b are aligned towards the candidate reflection/diffraction point 3:1. In the next step, the system records channel quality and antenna alignment angles at the candidate reflection/diffraction point 3:1. This procedure will then be repeated until the last of the candidate reflection/diffraction points 3:N has been reached. In the cases exemplified in FIGS. 1 and 2 there are eight candidate reflection/diffraction points, i.e. N equals eight in those figures. If this method should have been used in the examples in FIGS. 1 and 2, eight measurements would be made. When all predefined candidate reflection/diffraction points 3:1 to 3:N have been recorded, the system compares the recorded channel qualities of the N positions and uses this information in order to decide which point 3:1 to 3:N which shall be the preferred reflection/diffraction point 3:p. In general, the candidate reflection/diffraction point 3:n having the best channel quality will be selected. However, it is not necessarily the candidate reflection/diffraction point 3:n with the best channel quality which will be selected, other factors may be taken into account, e.g. if there may be some blocking feature due to changes in the LOS depending on the time of the day or over the year or the probability of a change of the candidate reflection/diffraction point surface in the near future.

According to another aspect of the disclosure, it is not necessarily needed to set a predefined number of candidate reflection/diffraction points 3:1 to 3:N. It may be possible to have some kind of threshold value of the channel quality above which it is decided that the channel strength is good enough and no evaluation of further candidate reflection/diffraction points 3:n is considered to be needed.

Figure 3B:
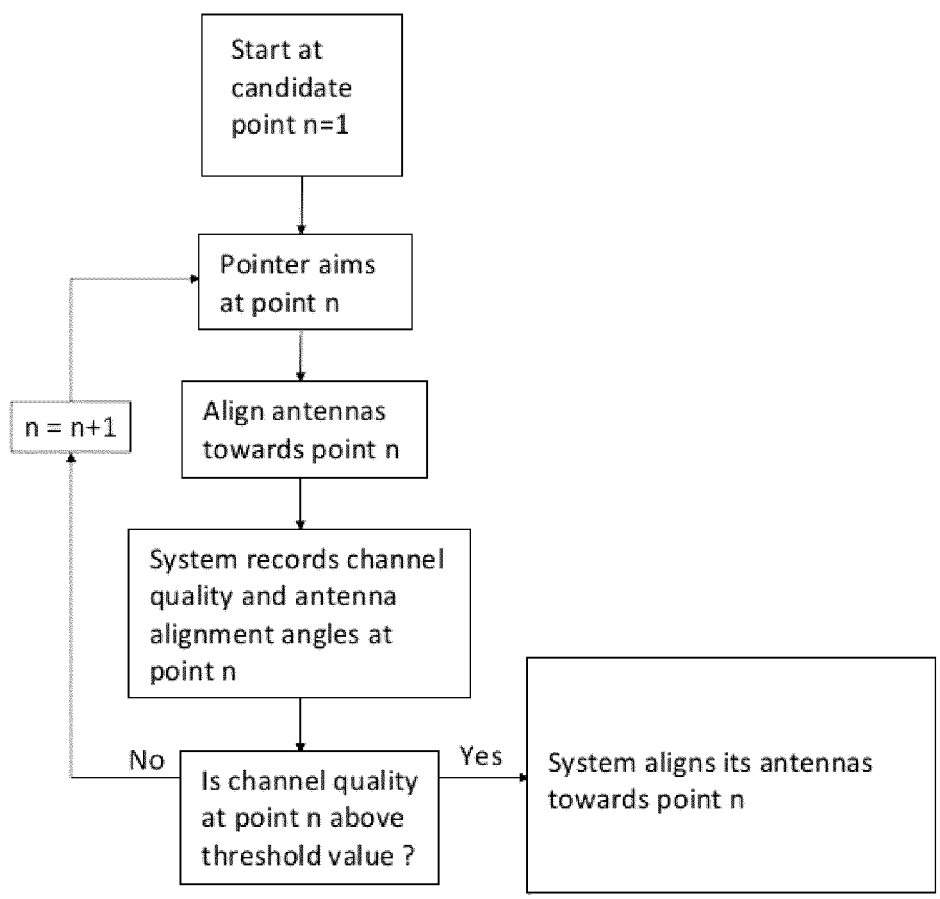

In FIG. 3b is disclosed a method in which the antenna alignment method starts with a pointer aiming at a first candidate reflection/diffraction point 3:1. In the next step, the system aligns the antennas 4a, 4b towards the first candidate reflection/diffraction point 3:1. The system records channel quality and antenna alignment angles at point 3:1. In the next step, there is an evaluation of the channel quality and the channel quality at point 3:1 is compared with a threshold value. In case the channel quality is above the threshold value, the system will keep the antennas in the aligned position and use the reflection/diffraction point 3:1 as the preferred reflection point 3:p to be used in the radio link system to link the first antenna 4a with the second antenna 4b.

In case the channel quality for the first candidate reflection/diffraction point 3:1 is below the channel quality threshold value, the next candidate reflection/diffraction point 3:2 will be pointed at by the pointer 1 and the alignment of the antennas 4a, 4b and evaluation of the channel quality of the second candidate reflection/diffraction point 3:2 will be done. The repeating of the evaluation of different candidate reflection/diffraction points 3:n will continue until a candidate reflection/diffraction point 3:N is detected at which the channel quality is above the threshold value. Channel quality could for example be evaluated by measuring received signal strength, Signal to Noise Ratio (SNR), Signal to Noise and Interference Ratio (SNIR) Bit Error Rate (BER) or Packet Error Rate.

The invention claimed is:

1. A method for alignment of an antenna in a microwave radio link system in Non-Line-Of Sight (NLOS) conditions, the method comprising:
providing a pointer indicating a first position on a surface to define a first candidate reflection/diffraction point on the surface;
aligning a first antenna at a first node and a second antenna at a second node towards the first candidate reflection/diffraction point; and
recording a relevant property concerning channel quality between the first node and the second node via the first candidate reflection/diffraction point;
wherein a drone is used as a pointer for the first candidate reflection/diffraction point.

2. The method of claim 1, further comprising:
repeating the providing, the aligning, and the recording for a number N of different candidate reflection/diffraction points;
comparing the relevant property concerning the channel quality between the first node and the second node via the N different candidate reflection/diffraction points;
selecting a preferred reflection/diffraction point from the N different candidate reflection/diffraction points based on the recorded relevant property concerning the channel quality between the first node and the second node via the candidate reflection/diffraction points;
aligning the first antenna and the second antenna towards the preferred reflection/diffraction point so as to link the first and second antennas in the microwave radio link system.

3. The method of claim 1, further comprising:
selecting the first candidate reflection/diffraction point as a preferred reflection/diffraction point if the recorded relevant property concerning the channel quality between the first node and the second node via the first candidate reflection/diffraction point is within a predefined range, or above or below a prescribed threshold value;
aligning the first antenna and the second antenna towards the preferred reflection/diffraction point so as to link the first and second antennas in the microwave radio link system.

4. The method of claim 1, wherein the drone is a passive device with a microwave corner reflector for using a microwave signal from the first and second antennas for alignment of the first and second antennas.

5. The method of claim 1, wherein the drone is a passive device with an ultrasound corner reflector for using an ultrasound signal from the first and second antennas for alignment of the first and second antennas.

6. The method of claim 1, wherein the drone has a light source such that alignment of the first and second antennas can be done by the use of cameras or other aiming means located in the vicinity of the first and second antennas.

7. The method of claim 1, wherein the drone is designed with a distinctive mark such that alignment of the first and second antennas can be done by the use of cameras or other aiming means located in the vicinity of the first and second antennas recognizing the drone.

8. A system for alignment of an antenna in a microwave radio link system in Non-Line-Of Sight (NLOS) conditions, the system comprising:
a first antenna at a first node
a second antenna at a second node
a pointer configured to indicate a position on a surface to define a candidate reflection/diffraction point on the surface; wherein the pointer is a drone;
circuitry configured to read a relevant property concerning channel quality between the first node and second node via the candidate reflection/diffraction point.

* * * * *